US008304042B2

(12) United States Patent
Ito et al.

(10) Patent No.: US 8,304,042 B2
(45) Date of Patent: Nov. 6, 2012

(54) RECORDING MEDIUM AND IMAGE FORMING APPARATUS

(75) Inventors: Yuka Ito, Ashigarakami-gun (JP); Takashi Matsubara, Ashigarakami-gun (JP); Shinji Hasegawa, Ashigarakami-gun (JP); Suguru Nakaso, Ashigarakami-gun (JP); Makoto Furuki, Ashigarakami-gun (JP); Minquan Tian, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 206 days.

(21) Appl. No.: 12/699,445

(22) Filed: Feb. 3, 2010

(65) Prior Publication Data

US 2011/0059270 A1 Mar. 10, 2011

(30) Foreign Application Priority Data

Sep. 4, 2009 (JP) ................................ 2009-204515

(51) Int. Cl.

| | |
|---|---|
| ***B44F 1/10*** | (2006.01) |
| ***B41M 5/00*** | (2006.01) |
| ***B44C 1/17*** | (2006.01) |
| ***G03G 9/00*** | (2006.01) |
| ***G03G 15/06*** | (2006.01) |
| ***C09D 103/06*** | (2006.01) |

(52) U.S. Cl. .................... 428/29; 428/195.1; 430/108.1; 106/287.25; 399/222

(58) Field of Classification Search .............. 428/195.1, 428/29; 430/108.1; 399/222; 106/287.25
See application file for complete search history.

(56) References Cited

U.S. PATENT DOCUMENTS

| | | | | |
|---|---|---|---|---|
| 7,910,733 | B2 * | 3/2011 | Tian et al. | 544/249 |
| 2003/0198793 | A1 * | 10/2003 | Landa et al. | 428/209 |
| 2010/0059691 | A1 * | 3/2010 | Lewis et al. | 250/473.1 |
| 2010/0092885 | A1 * | 4/2010 | Ito et al. | 430/108.21 |
| 2010/0203437 | A1 * | 8/2010 | Yanagida | 430/105 |

FOREIGN PATENT DOCUMENTS

| | | | |
|---|---|---|---|
| JP | 2006-276179 | A | 10/2006 |
| WO | WO 2007132214 | A1 * | 11/2007 |

* cited by examiner

*Primary Examiner* — Bruce H Hess
*Assistant Examiner* — Laura C Dettinger
(74) *Attorney, Agent, or Firm* — Sughrue Mion, PLLC

(57) ABSTRACT

The present invention provides a recording medium containing a first image formed with a first recording material; and a second image comprising a first region formed with a second recording material having approximately the same light fastness as that of the first recording material, and a second region formed with a third recording material having higher light fastness than that of the first recording material, a color of the second region being a color corresponding to any stage of a process of discoloration of the first region.

11 Claims, 7 Drawing Sheets

14
14A
15
$14B_1$
$14B_2$
14B
DISCOLORATION 14
14A
15
$14B_1$
$14B_2$
14B 14
14A
15
$14B_1$
$14B_2$
DISCOLORATION 14
14A
15
$14B_1$
$14B_2$

DISCOLORATION
DISCOLORATION
14
14A
15
14B1 14B2 14B3 14B4 14B5
14B

RECORDING MEDIUM AND IMAGE FORMING APPARATUS

CROSS-REFERENCE TO RELATED APPLICATIONS

This application is based on and claims priority under 35 USC 119 from Japanese Patent Application No. 2009-204515 filed on Sep. 4, 2009.

BACKGROUND OF THE INVENTION

1. Technical Field

The present invention relates to a recording medium and an image forming apparatus.

2. Related Art

A recording medium on which a first image constituted of an invisible toner that absorbs infrared light and a second image constituted of a second toner that absorbs ultraviolet light and emits light has been proposed.

SUMMARY

According to an aspect of the invention, there is provided an image fixing device containing: a first image formed with a first recording material; and a second image comprising a first region formed with a second recording material having approximately the same light fastness as that of the first recording material, and a second region formed with a third recording material having higher light fastness than that of the first recording material, a color of the second region being a color corresponding to any stage of a process of discoloration of the first region.

BRIEF DESCRIPTION OF THE DRAWINGS

Exemplary embodiments of the invention will be described in detail based on the following figures, wherein.

DETAILED DESCRIPTION OF THE INVENTION

Hereinafter, an exemplary embodiment of the present invention will be described with reference to the drawings.

Figure 1:
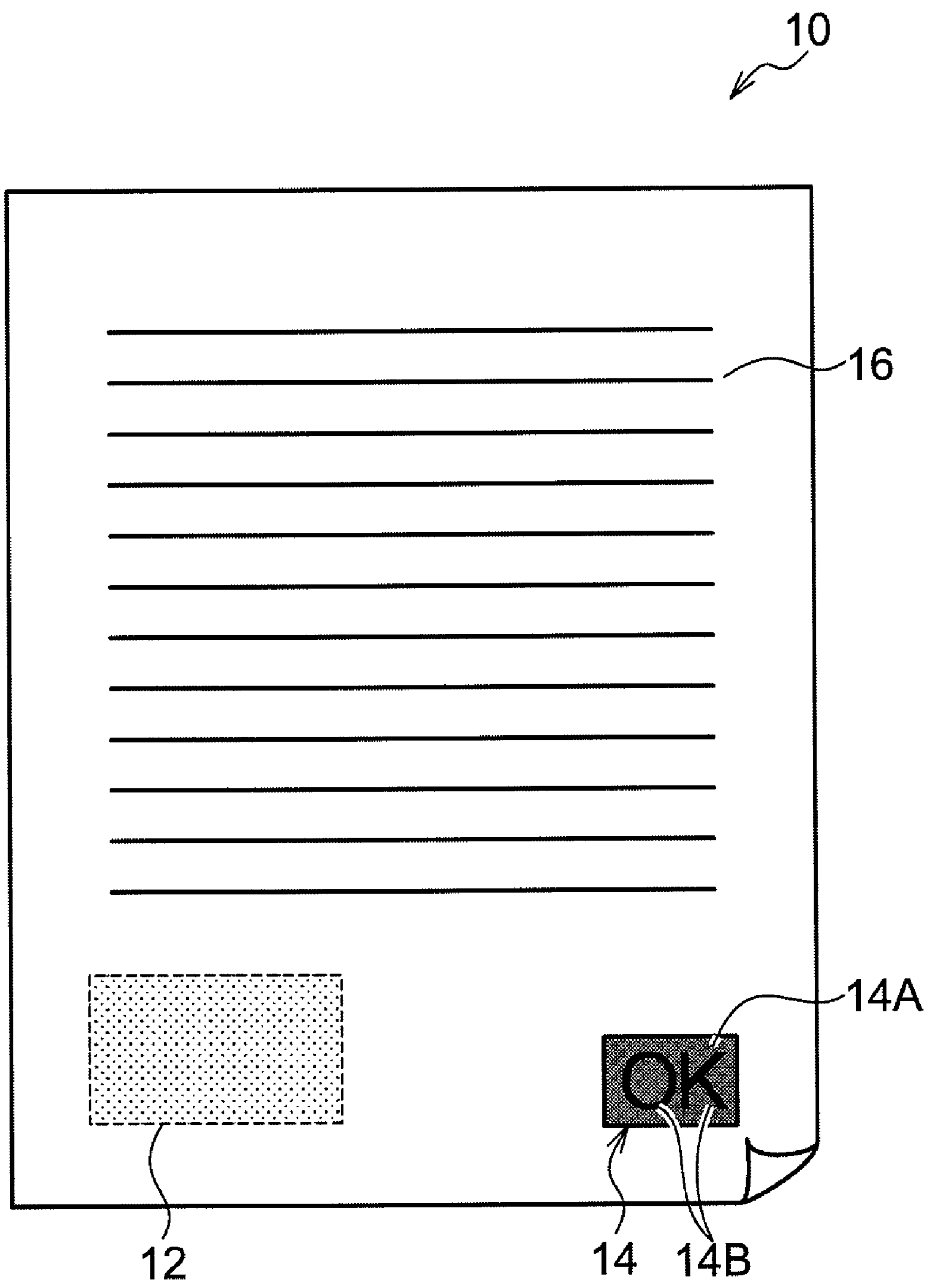
FIG. 1 is a schematic diagram showing a recording medium according to an exemplary embodiment of the invention.

As shown in FIG. 1, a recording medium 10 of the exemplary embodiment of the invention has an invisible image 12 and a visible image 14 formed thereon.

The invisible image 12 is formed by a first recording material. The visible image 14 is constituted to include a visible first region 14A that is formed by a second recording material having approximately the same light fastness as that of the first recording material, and a second region 14B that is formed by a third recording material having higher light fastness than that of the first recording material. Furthermore, this second region 14B exhibits a color corresponding to any stage of a process of discoloration of the first region 14A.

Furthermore, according to the exemplary embodiment of the invention, the phrase "the first recording material and the second recording material having approximately the same light fastness" implies that the first recording material and the second recording material have approximately the same rate of discoloration. Specifically, the phrase implies that the color difference, ΔE, of the first recording material and the second recording material is maintained at less than 6 even after a lapse of time, in an environment of the same temperature and humidity.

According to the exemplary embodiment of the invention, the first recording material contains a first material having infrared absorption properties, as a coloring material. The second recording material contains the first material as a coloring material. The third recording material contains at least one second material having higher light fastness than that of the first material, as a coloring material. Here, the coloring material contained in the first recording material is only the first material, the coloring material contained in the second recording material is only the first material, and the coloring material contained in the third recording material is only the second material.

According to the exemplary embodiment of the invention, the invisible image 12 is an image that is not visible, and the visible image 14 is an image that is visible.

As described in the above, according to the exemplary embodiment of the invention, there will be explained an embodiment in which the coloring material contained in the first recording material constituting the invisible image 12, and the coloring material contained in the second recording material constituting the first region 14A of the visible image 14, are the same (first material). However, it is acceptable as long as coloring materials which make the light fastness of the first recording material and the second recording material to be approximately the same, are contained in the first recording material and the second recording material, respectively, and the invention is not intended to be limited to the case where the coloring material contained in the first recording material and the coloring material contained in the second recording material are the same material.

According to the exemplary embodiment of the invention, the invisible image 12 is described as an image that is invisible, but the invisible image 12 may be an image that is visible.

According to the exemplary embodiment of the invention, the term "visible" implies that the relevant object is visually recognized under the visible light. Specifically, in the image region of the visible image 14 which is an image that is visible, the color difference ΔE with the recording medium 10 is 6 or greater. Therefore, the visible image 14 on the recording medium 10 is visually recognized.

Furthermore, according to the exemplary embodiment of the invention, the term "invisible" means that the relevant object is difficult to be recognized visually under the visible light (that is, ideally, the relevant object is invisible). Therefore, in the image region of the invisible image 12 is not visible, and the color difference ΔE with the recording medium 10 is less than 6.

As described above, the first material has infrared absorption properties. This phrase "having infrared absorption properties" implies that when an image is formed with a print coverage ratio of 100% using the first material, the reflectance of the image when irradiated with infrared light is 35% or less for at least any wavelength in the wavelength region of the infrared light.

Therefore, although the invisible image 12 is not visible, the image can be read when the image is irradiated with infrared light and the image receives the reflected light. For example, the invisible image 12 is read with a semiconductor laser or light emitting diode that irradiates a light having a wavelength in the infrared region, as a light source for optical reading, and using a general-purpose light receiving element having high spectral sensitivity to infrared light. An example of the light receiving element may be a light receiving element based on silicon (CCD or the like).

The coloring material contained in the first recording material constituting the invisible image 12 and the second recording material constituting the first region 14A of the visible image 14, is the same first material according to the exemplary embodiment of the invention. This first material has infrared absorption properties, and also has light absorption in the visible region, which is smaller than the infrared region (will be discussed in detail later). Therefore, according to the present exemplary embodiment, the invisible image 12 constituted of the first recording material is made invisible, while the first region 14A of the visible image 14 constituted of the second recording material is made visible, by adjusting the content (concentration) of the first material contained in the first recording material and the second recording material (will be discussed in detail later). Furthermore, in addition to the adjusting the content (concentration) of the first material contained in the first recording material and the second recording material, the color difference ΔE with the recording medium may also be changed by changing the coverage ratio of the image. Specifically, there may be mentioned an example of making the visible first region 14A into a so-called solid image having a coverage ratio of 100%, and making the invisible image 12 into a dotted pattern having a coverage ratio of about 10%, or the like.

Here, the invisible image 12 formed on the recording medium 10 is invisible and is not identified visually. The invisible image is readable when irradiated with infrared light, but if the first material having infrared absorption properties, which is contained in the invisible image 12, undergoes deterioration, reading under infrared light may become difficult (in other words, the first material has reached an end of its useful life). However, since the invisible image 12 is "invisible" after all, it is difficult to determine by visual inspection whether the first material contained in the invisible image 12 is in a deteriorated state.

According to the exemplary embodiment of the invention, the "deterioration of the first material" implies that the infrared absorption properties of the first material as a coloring material are decreased. Specifically, the term implies that the absorbance in the infrared wavelength region is decreased as compared with the absorbance before deterioration, and reading by a light receiving element becomes difficult. Although it is inappropriate to conclude in one word since this depends on the sensitivity of the light receiving element, in regard to the phrase "the first material has reached an end of its useful life," one indication may be provided, for example, when an image having a print coverage ratio of 100% is formed using the first material, by the reflectance of the image upon irradiation with infrared light becomes greater than 35% over the entire wavelength region of the infrared light.

Thus, on the recording medium 10 according to the exemplary embodiment of the invention, a visible image 14 is formed together with the invisible image 12. This visible image 14 is provided with a visible first region 14A constituted of a second recording material containing the same first material as that of the invisible image 12, and a visible second region 14B constituted of a third recording material containing at least one second material having higher light fastness than that of the first material. This second region 14B exhibits a color corresponding to any stage of a process of discoloration of the first region 14A.

This "course of discoloration of the first region 14A" represents changes in the color (that is, the extent of progress of discoloration) of the first region 14A due to the discoloration (deterioration) of the first material. Furthermore, the "color corresponding to any stage of a process of discoloration of the first region 14A" may be, for example, the color of the first region 14A in the state prior to discoloration of the first material, a color exhibited by the first region 14A when the first material has reached an end of its useful life, or a color corresponding to each stage of change made in accordance with the progress of discoloration starting from before the discoloration of the first material until the first material reaches an end of its useful life.

This second region 14B may be in the form which exhibits one color corresponding to any stage of a process of discoloration of the first region 14A, or may be in the form which exhibits plural colors respectively corresponding to plural stages of the course of discoloration of the first region 14A.

The color of this second region 14B may be adjusted so as to be a color corresponding to any stage of a process of discoloration of the first region 14A, by mixing at least one second material that is contained in the third recording material constituting the second region 14B, the second material having higher light fastness than the first material. For example, the color corresponding to any stage of a process of discoloration of the first region 14A may be adjusted by providing coloring materials for C (cyan), M (magenta), Y (yellow) and K (black) as plural types of the second material, and adjusting the mixing amounts of these coloring material.

The at least one second material contained in the third recording material is a coloring material having higher light fastness compared with the first material. This phrase "having higher light fastness compared with the first material" implies specifically that the material has a slower rate of discoloration compared with the first material.

Accordingly, when a visible image 14 having the first region 14A that makes use of the first material as the coloring material and the second region 14B that makes use of the second material as the coloring material is formed on the recording medium 10, the difference in the rate of discoloration between the first material and the second material is represented by the color difference between the first region 14A and the second region 14B in the visible image 14.

Therefore, as the color difference between the first region 14A and the second region 14B in this visible image 14 is visually identified, consequently the degree of deterioration of the first material contained in the invisible image 12 is visually identified.

This visible image 14 is preferably provided at a location that does not overlap with another visible printed image 16 or the invisible image 12 on the recording medium 10. Furthermore, the size of this visible image 14 may be a size to the extent that the color difference between the first region 14A and the second region 14B on the recording medium 10 is recognizable.

Here, the recording medium 10 according to the present exemplary embodiment corresponds to the recording medium of the invention, the invisible image 12 corresponds to the invisible image in the recording medium of the invention, and the visible image 14 corresponds to the visible image in the recording medium of the invention.

FIG. 2 to FIG. 5 present examples of the visible image 14 formed together with the invisible image 12 on the recording medium shown in FIG. 1.

The visible image 14 in FIG. 2 is constituted to include a visible first region 14A formed by a second recording material containing a first material, and a visible second region 14B formed by a third recording material containing at least one second material having higher light fastness than that of the first material.

In the example shown in FIG. 2, the second region 14B has been formed in the shape of characters "OK" by a third recording material containing at least one second material having higher light fastness than that of the first material. Furthermore, in the example shown in FIG. 2, the color of the second region 14B (that is, the third recording material) is selected to be the same color as a color exhibited by the first region 14A when the first material is discolored and reaches an end of its useful life.

This second region 14B is surrounded on the outside by a solid image (that is, an image with a coverage ratio of 100%) formed by the second recording material containing the first material, which forms the first region 14A.

Figures 2A, 2B, 2C:
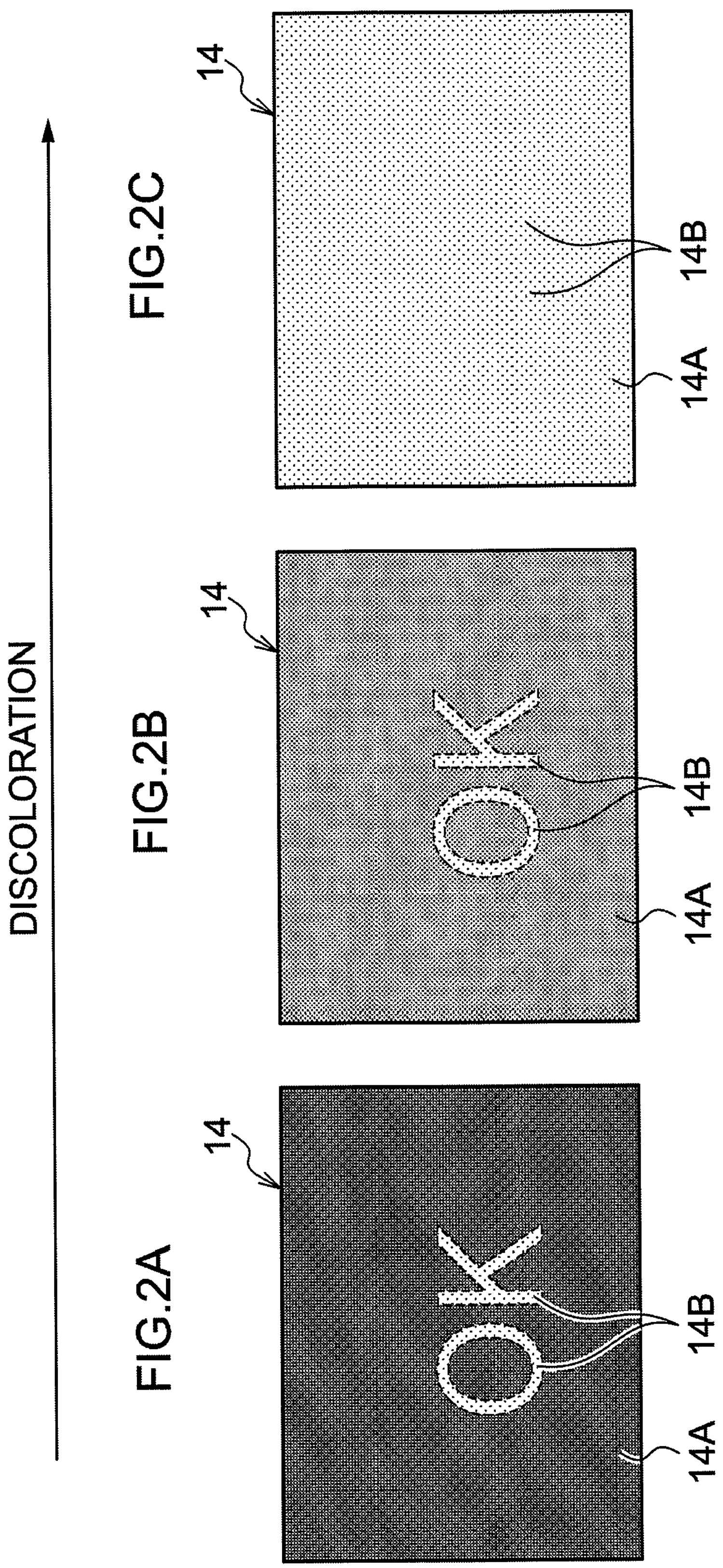
FIG. 2A is a schematic diagram showing a visible image formed on the recording medium according to an exemplary embodiment of the invention, which diagram shows the picture of a first region of the visible image undergoing discoloration.
FIG. 2B is a schematic diagram showing a visible image formed on the recording medium according to an exemplary embodiment of the invention, which diagram shows the picture of a first region of the visible image undergoing discoloration.
FIG. 2C is a schematic diagram showing a visible image formed on the recording medium according to an exemplary embodiment of the invention, which diagram shows the picture of a first region of the visible image undergoing discoloration.

In the example shown in FIG. 2, in the state before the first material contained in the first region 14A undergoes discoloration, the color difference between the first region 14A and the second region 14B in the visible image 14 is visually identified, as shown in FIG. 2A. Therefore, it is conceived that in the state shown in FIG. 2A, the state before the first material undergoes discoloration is visually identified; in other words, it is visually identified that deterioration of the first material constituting the invisible image 12 (see FIG. 1) is not in progress.

When the discoloration of the first region 14A proceeds as a result of the discoloration of the first material, the color difference with the second region 14B formed in the shape of characters "OK" is narrowed as compared with the case shown in FIG. 2A (see FIG. 2B). In addition, the color difference between the first region 14A and the second region 14B is further narrowed as the discoloration of the first material further proceeds, and thus it becomes difficult to visually recognize the boundaries between the first region 14A and the second region 14B (see FIG. 2C).

Accordingly, in the state shown in FIG. 2B, it is visually identified that the deterioration of the first material constituting the invisible image 12 is in progress, while in the state shown in FIG. 2C, it is visually identified that the first material constituting the invisible image 12 has reached an end of its useful life.

Therefore, since the color difference between the first region 14A and the second region 14B of the invisible image 12 is visually recognized, the degree of deterioration of the first material contained in the invisible image 12 is visually identified.

Furthermore, in the example shown in FIG. 2, when the invisible image enters into the state where the color difference between the first region 14A and the second region 14B is visually unrecognizable, it is indicated that the invisible image 12 has reached an end of its useful life, and a smaller color difference between these regions indicates that the deterioration of the invisible image 12 is in progress. Accordingly, as shown in FIG. 2, when the color of the second region 14B is formed to be the color exhibited when the first material contained in the first region 14A has reached an end of its useful life, the characters exhibited by the color difference between the first region 14A and the second region 14B are preferably selected from characters which mean that deterioration of the first material is not in progress, such as "OK" or "GOOD".

FIG. 3 shows an aspect different from that shown in FIG. 2.

In the example shown in FIG. 3, the first region 14A is formed in the shape of characters "NG" with the second recording material containing the first material. Then, this first region 14A formed in the shape of characters "NG" is surrounded on the outside by a solid image formed by the third recording material, which constitutes the second region 14B.

This second region 14B is formed by the third recording material containing at least one second material having higher light fastness than that of the first material. In the example shown in FIG. 3, the color of the second region 14B (that is, the third recording material) is adjusted to a color exhibited in the state before the first region 14A reaches an end of its useful life, and the second region is recorded.

Figures 3A, 3B, 3C:
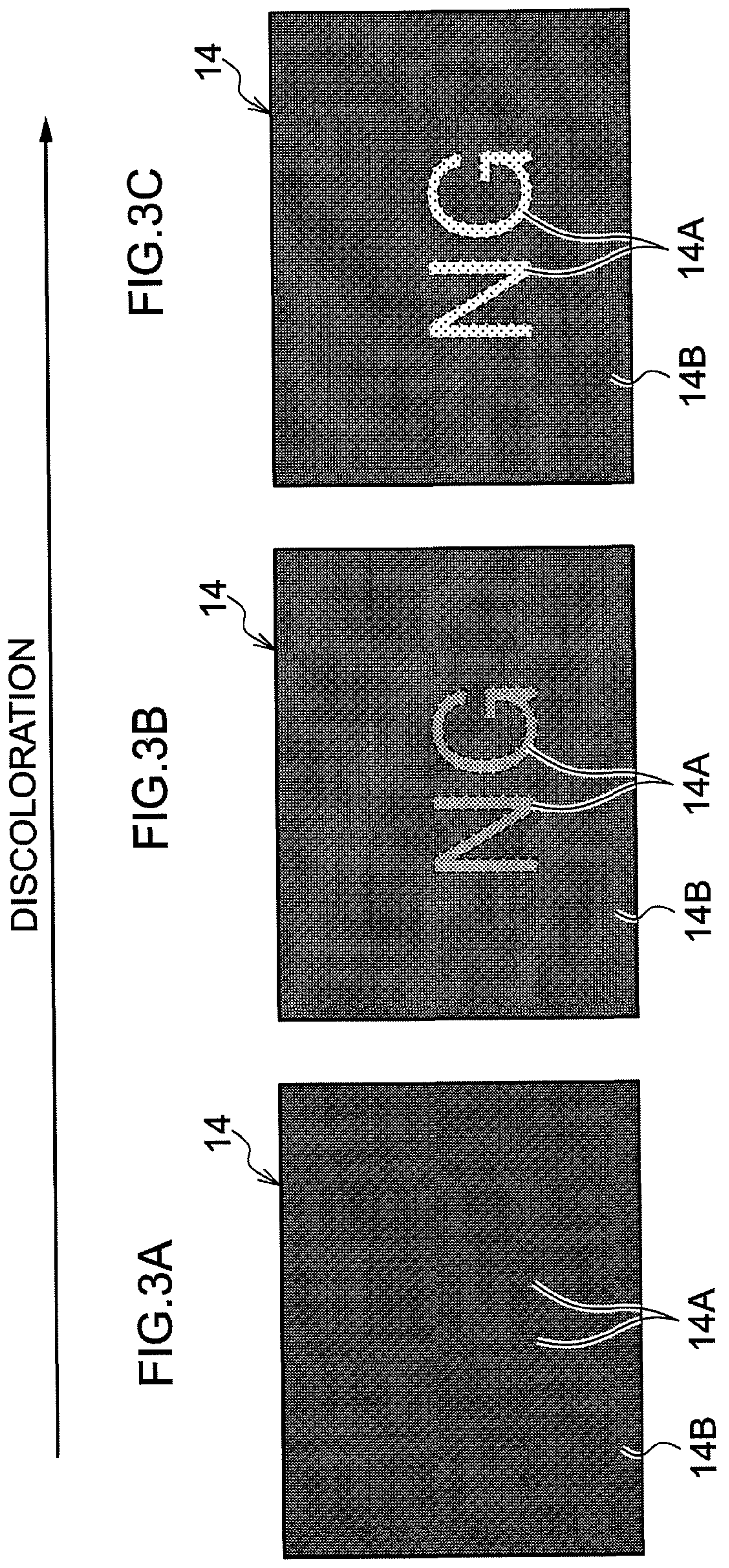
FIG. 3A is a schematic diagram showing a visible image formed on the recording medium according to an exemplary embodiment of the invention, which diagram shows the picture of a first region of the visible image undergoing discoloration.
FIG. 3B is a schematic diagram showing a visible image formed on the recording medium according to an exemplary embodiment of the invention, which diagram shows the picture of a first region of the visible image undergoing discoloration.
FIG. 3C is a schematic diagram showing a visible image formed on the recording medium according to an exemplary embodiment of the invention, which diagram shows the picture of a first region of the visible image undergoing discoloration.

In this way, in the state before the first region 14A undergoes discoloration, the color difference between the first region 14A and the second region 14B in the visible image 14 is not recognized visually, and the characters "NG" of the first region 14A are visually unrecognized, as shown in FIG. 3A.

Then, discoloration of the first region 14A (the region formed in the shape of characters "NG") proceeds as a result of the proceeding of the discoloration of the first material. When the color difference with the second region 14B is widened, the boundaries between the first region 14A and the second region 14B begin to be visually recognizable, as shown in FIG. 3B. As the discoloration of the first region 14A further proceeds, the first region 14A formed in the shape of characters "NG" is clearly identified visually as shown in FIG. 3C.

Accordingly, in the state shown in FIG. 3A, it is visually identified that the first material constituting the invisible image 12 is not undergoing deterioration; in the state shown in FIG. 3B, it is visually identified that the deterioration of the first material constituting the invisible image 12 is in progress; and in the state shown in FIG. 3C, it is visually identified that the first material constituting the invisible image 12 has reached an end of its useful life.

Therefore, since the color difference between the first region 14A and the second region 14B of the invisible image 12 is visually recognized, the degree of deterioration of the first material contained in the invisible image 12 is visually identified.

Furthermore, in the example shown in FIG. 3, when the invisible image enters into the state where the color difference between the first region 14A and the second region 14B is clearly recognizable visually, it is indicated that the invisible image 12 has reached an end of its useful life, and a smaller color difference between these regions indicates that the deterioration of the invisible image 12 is not in progress. Accordingly, as shown in FIG. 3, when the color of the second region 14B is formed to be the color exhibited when the first material contained in the first region 14A is in an undeteriorated state, the characters exhibited by the color difference between the first region 14A and the second region 14B are preferably selected from characters which mean that deterioration of the first material is in progress, such as "NG" or "BAD".

FIG. 4 shows an aspect different from those shown in FIG. 2 and FIG. 3.

In the example shown in FIG. 4, the first region 14A is formed as a solid image in the center of the visible image 14, with the second recording material containing the first material. Then, this first region 14A is surrounded on the outside by a solid image formed with the third recording material, which constitutes a second region 14$B_1$.

This second region 14$B_1$ is formed with the third recording material containing at least one second material. In the example shown in FIG. 4, the color of this second region 14$B_1$ (that is, the third recording material) is adjusted to a color exhibited by the first region 14A when the first material is in the state before discoloration, and the second region is recorded.

Furthermore, in the example shown in FIG. 4, the visible image 14 has a second region 14$B_2$ formed with the third recording material. In this second region 14$B_2$, plural types of colors showing the changes in the color of the first region 14A due to discoloration are exhibited by the third recording material containing at least one second material. These plural types of colors may be, for example, the colors respectively corresponding to the state before the discoloration of the first material occurs, the state where discoloration begins, the state where discoloration proceeds, the state where the first material reaches an end of its useful life, and the state where the first material is further discolored beyond an end of its useful life. In the example shown in FIG. 4, the plural types of colors shown in this second region 14$B_2$ are arranged in an order corresponding to the extent of progress of discoloration, starting from the color of the first region 14A in the state before discoloration. Furthermore, in the region showing a color exhibited by the first region 14A when the first material has reached an end of its useful life, among the plural types of colors exhibited in this second region 14$B_2$, a mark 15 indicating the end of useful life is shown.

The plural types of colors exhibited in this second region 14$B_2$ are shown by adjusting the type of the second materials of plural types that are contained in the third recording material, the mixing ratios or contents of the second materials of plural types, or the like.

Figures 4A, 4B, 4C, 4D:
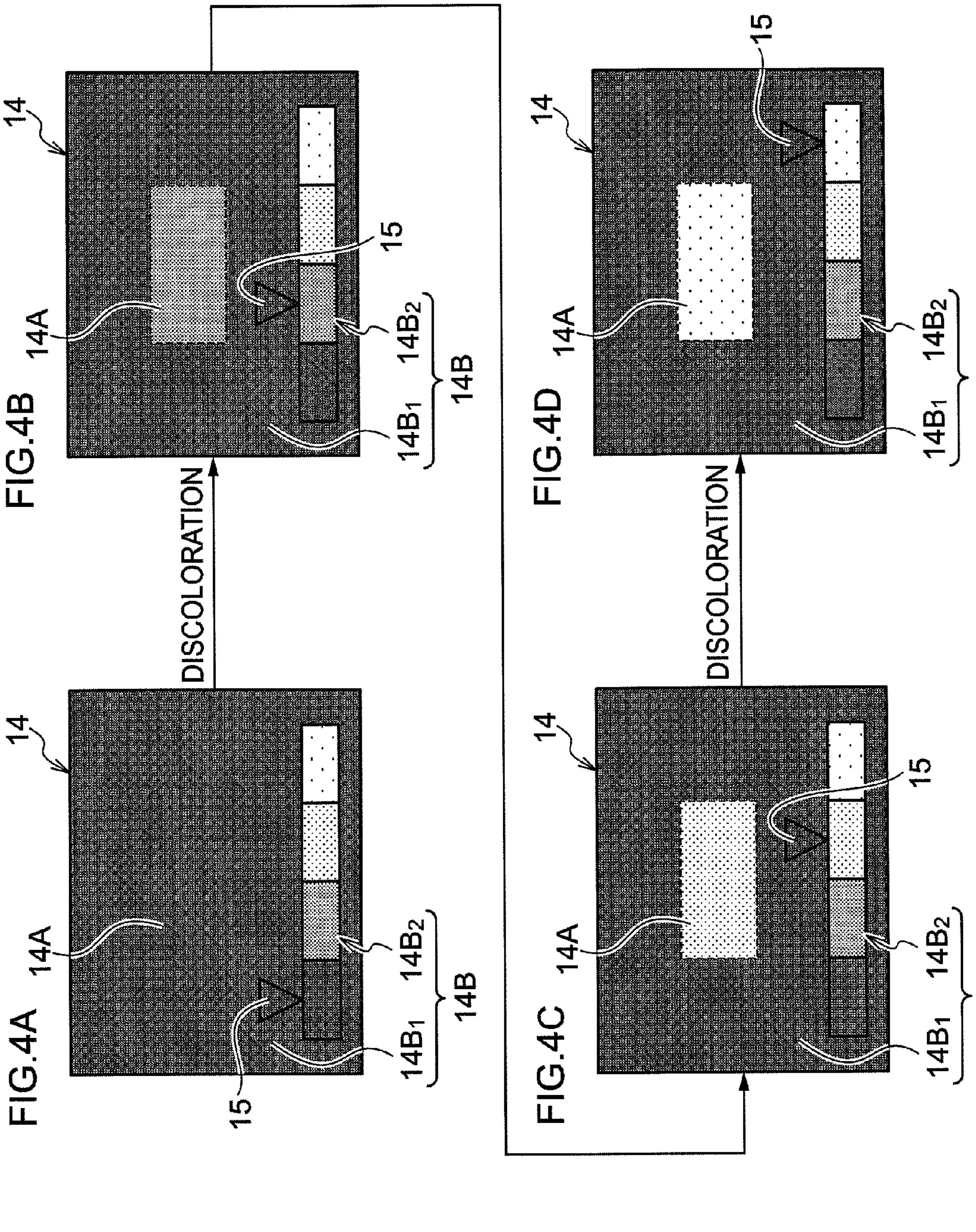
FIG. 4A is a schematic diagram showing a visible image formed on the recording medium according to an exemplary embodiment of the invention, which diagram shows the picture of a first region of the visible image undergoing discoloration.
FIG. 4B is a schematic diagram showing a visible image formed on the recording medium according to an exemplary embodiment of the invention, which diagram shows the picture of a first region of the visible image undergoing discoloration.
FIG. 4C is a schematic diagram showing a visible image formed on the recording medium according to an exemplary embodiment of the invention, which diagram shows the picture of a first region of the visible image undergoing discoloration.
FIG. 4D is a schematic diagram showing a visible image formed on the recording medium according to an exemplary embodiment of the invention, which diagram shows the picture of a first region of the visible image undergoing discoloration.

In this way, in the state before the first region 14A undergoes discoloration, the color difference between the first region 14A and the second region 14$B_1$ in the visible image 14 is not recognized visually, and the boundaries between the first region 14A and the second region 14$B_1$ are visually unrecognized, as shown in FIG. 4A. In this case, when it is visually recognized concerning to which color among the plural types of colors included in the second region 14$B_2$ the color of the first region 14A is the closest, the degree of deterioration of the first material contained in the invisible image 12 is visually identified.

When the discoloration of the first region 14A proceeds as a result of the proceeding of the discoloration of the first material, and the color difference with the second region 14$B_1$ is widened, as shown in FIG. 4B, the boundaries between the first region 14A and the second region 14$B_1$ begin to become recognizable. Then, as the discoloration of the first region 14A further proceeds, the color difference between the first region 14A and the second region 14$B_1$ is widened, and these boundaries are more clearly recognized, as shown in FIG. 4C and FIG. 4D. At this time, when it is visually recognized concerning to which color among the plural types of colors included in the second region 14$B_2$ the color of the first region 14A in each stage of the course of discoloration is the closest, the degree of deterioration of the first material contained in the invisible image 12 is visually identified.

Furthermore, in the upper region of the second region 14$B_2$ which exhibits the color of the first region 14A, the mark 15 indicating the end of useful life appears. Thereby, as the difference between the color corresponding to the mark 15 above the second region 14$B_2$ and the color of the first region 14A is identified, the reference of time period until the first material contained in the invisible image 12 reaches an end of its useful life is visually identified.

FIG. 5 shows an aspect different from those shown in FIG. 2, FIG. 3 and FIG. 4.

In the example shown in FIG. 5, the second region 14B is formed as plural types of color samples (region $\mathbf{14}B_1$ to region $\mathbf{14}B_5$) exhibiting changes in the color of the first region 14A as a result of the discoloration of the first material. Then, this second region 14B is surrounded on the outside by a solid image formed by the second recording material, which constitutes the first region 14A.

These plural types of color samples exhibited by the region $\mathbf{14}B_1$ to region $\mathbf{14}B_5$ in the second region 14B exhibit the color of the first region 14A resulting from the discoloration of the first material. These color samples (region $\mathbf{14}B_1$ to region $\mathbf{14}B_5$) respectively exhibit the colors corresponding to the state before the discoloration of the first material occurs, the state where discoloration begins, the state where discoloration proceeds, the state where the first material reaches an end of its useful life, and the state where the first material is further discolored beyond an end of its useful life. The plural types of color samples exhibited by the region $\mathbf{14}B_1$ to the region $\mathbf{14}B_5$ in this second region 14B are arranged in an order corresponding to the extent of progress of discoloration, starting from the color of the first region 14A in the state before the first material undergoes discoloration.

Furthermore, among the plural types of the color samples exhibited by the region $\mathbf{14}B_1$ to the region $\mathbf{14}B_5$ in the second region 14B, the region exhibiting the color of the first region 14A when the first material has reached an end of its useful life, is accompanied by a mark 15 indicating the end of useful life.

These plural types of color samples exhibited by the region $\mathbf{14}B_1$ to the region $\mathbf{14}B_5$ in the second region 14B are shown by adjusting the type of the second materials of plural types that are contained in the third recording material, the mixing ratios or contents of the second materials of plural types, or the like.

Figures 5A, 5B, 5C, 5D:
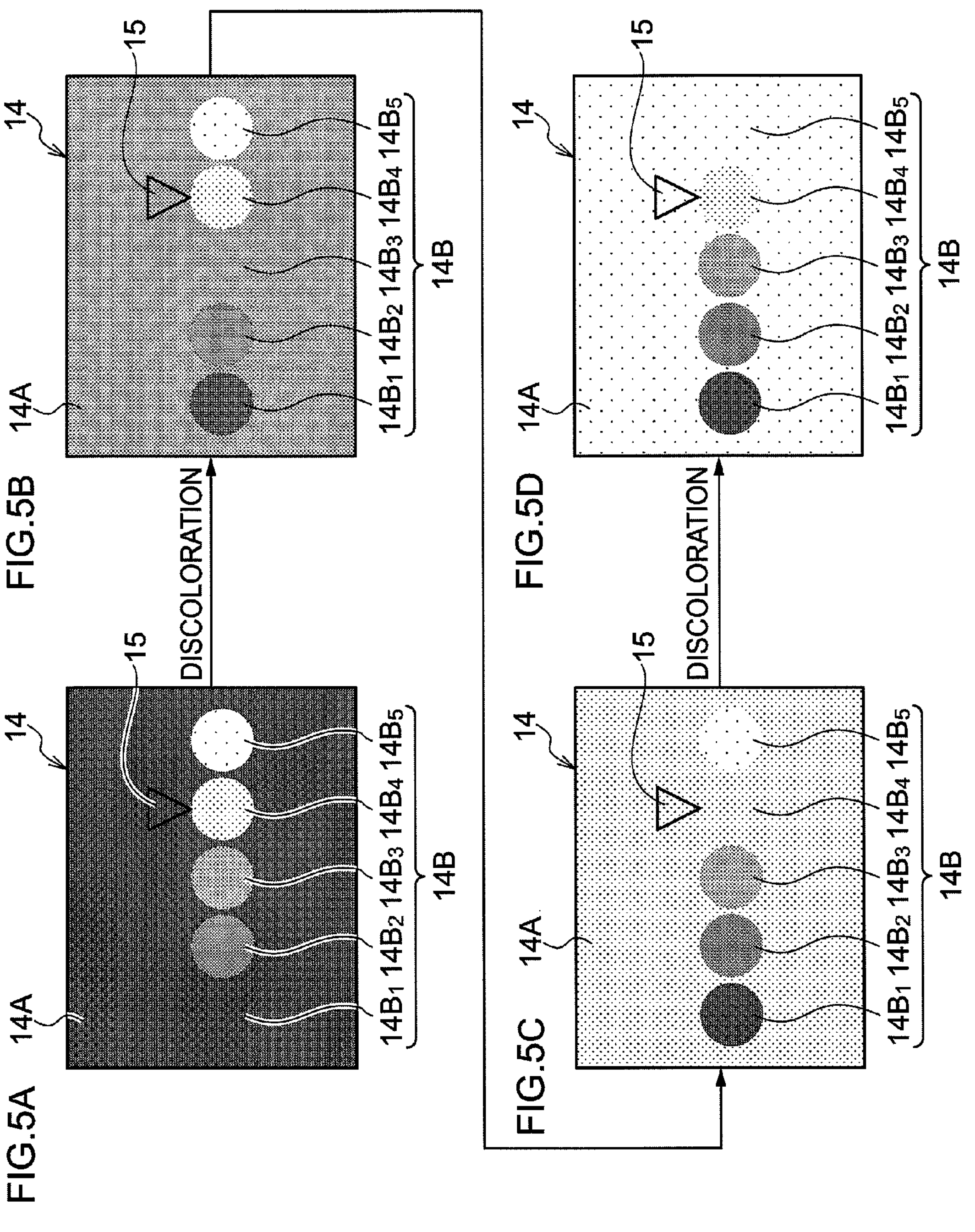
FIG. 5A is a schematic diagram showing a visible image formed on the recording medium according to an exemplary embodiment of the invention, which diagram shows the picture of a first region of the visible image undergoing discoloration.
FIG. 5B is a schematic diagram showing a visible image formed on the recording medium according to an exemplary embodiment of the invention, which diagram shows the picture of a first region of the visible image undergoing discoloration.
FIG. 5C is a schematic diagram showing a visible image formed on the recording medium according to an exemplary embodiment of the invention, which diagram shows the picture of a first region of the visible image undergoing discoloration.
FIG. 5D is a schematic diagram showing a visible image formed on the recording medium according to an exemplary embodiment of the invention, which diagram shows the picture of a first region of the visible image undergoing discoloration.

In this way, in the state before the first region 14A undergoes discoloration, the boundaries between the first region 14A and the region $B_1$ exhibiting the "color before discoloration (color of non-deterioration)" among the plural types of colors included in the second region 14B in the visible image 14 are not visually recognized, as shown in FIG. 5A.

Furthermore, when discoloration of the first region 14A proceeds as a result of the progress of the discoloration of the first material, as shown in FIG. 5B, FIG. 5C and FIG. 5D, the region included in the second region 14B that is not visually recognized, at the boundaries with the first region 14A in the visible image 14, undergoes transition to the region $\mathbf{14}B_2$, region $\mathbf{14}B_3$, region $\mathbf{14}B_4$ and region $\mathbf{14}B_5$.

Accordingly, when it is visually recognized concerning to which color among the plural regions (region $\mathbf{14}B_1$ to region $\mathbf{14}B_5$) included in the second region 14B the color of the first region 14A in each stage of the course of discoloration is the closest, the degree of deterioration of the first material contained in the invisible image 12 is visually identified.

Furthermore, among the plural regions in the second region 14B, the region exhibiting a color of the first region 14A obtainable when the first material has reached an end of its useful life, is accompanied by a mark 15 indicating the end of useful life. Therefore, as the color difference between the color corresponding to the mark 15 in the second region 14B and the first region 14A is identified, the reference of time period until the first material contained in the invisible image 12 reaches an end of its useful life is visually identified.

Therefore, the degree of progress of deterioration or the end of useful life of the first material contained in the invisible image 12 (see FIG. 1), is visually identified.

In the present exemplary embodiment of the invention, an aspect by which the degree of progress of deterioration or the end of useful life of the first material contained in the invisible image 12 is visually identified, has been explained. However, the image serving as the object of identifying the degree of progress of deterioration or the end of useful life, is not limited to an invisible image that is not visible, and may also be a visible image that is visible. In this case, for example, when two or more types of recording materials having different light fastness are prepared, and visible images are formed using the respective recording materials, a color difference is identified as described above. Thus, the degree of progress of deterioration or the end of useful life of the coloring material contained in the visible image formed from a recording material having poorer light fastness, is visually identified.

Furthermore, in the visible image 14, the first region 14A and the second region 14B may be provided in succession, or may be provided with a large distance between them. However, from the viewpoint of the ease of visual discrimination of the degree of deterioration of the invisible image 12, it is desirable that the two regions are provided in succession.

(Recording Material and Coloring Material)

Hereinafter, the first recording material containing the first material as a coloring material, the second recording material containing the first material as a coloring material, and the third recording material containing at least one second material as a coloring material, will be explained in detail.

The first material contained in the first recording material and the second recording material as the coloring material has infrared absorption properties as explained above. The invisible image 12 constituted by the first recording material is invisible, and the visible image 14 constituted by the second recording material is visible. This adjustment of visibleness and invisibleness is achieved by adjusting the content (concentration) of the first material contained in the first recording material and the second recording material.

That is, as for the first material, a dye that has infrared absorption properties and also exhibits a certain degree of light absorption even in the wavelength region of the visible light may be used. Here, it is essential that the absorbance of this first material in the wavelength region of the visible light be smaller than the maximum absorbance in the wavelength region of the infrared light (specifically, ½ or less of the maximum absorbance in the wavelength region of the infrared light, or the like).

Furthermore, when the content of the first material contained in the second recording material is adjusted so as to make the reflectance of the second recording material at any wavelength in the wavelength region of the visible light 75% or less, the image constituted by the second recording material becomes visible.

Therefore, the content of the first material contained in the first recording material as the coloring material is lower than the content of the first material contained in the second recording material as the coloring material, and it is desirable to adjust the contents so that the first recording material would be invisible, and the second recording material would be visible. Furthermore, as described above, the color difference ΔE with the recording medium may also be changed by changing the coverage ratio of the image.

It is desirable that the first recording material that forms the invisible image 12 according to the exemplary embodiment of the invention satisfy the conditions represented by the following formulas (II) and (III) in those parts with a printing coverage ratio of 100%.

$$0 \leqq \Delta E \leqq 16 \qquad \text{Formula (II)}$$

$$(100-R) \geqq 75 \qquad \text{Formula (III)}$$

In the formula (II), ΔE represents the color difference in the CIE 1976 L*a*b* color system represented by the following formula (IV), and in the formula (III), R (unit: %) represents the reflectance of infrared radiation at a wavelength of 850 nm in an invisible image.

$$\Delta=\sqrt{(L_1-L_2)^2+(a_1-a_2+(b_1-b_2)^2} \qquad \text{(IV)}$$

It is thought that when the conditions represented by the formulas (II) and (III) are satisfied, a balance is achieved between the invisibility of the invisible image 12 and the ease of readout of the invisible image 12 under infrared light. It is also thought that thereby the long-term reliability for the recording medium 10 having the invisible image 12 recorded thereon is realized.

In the formula (IV), $L_1$, $a_1$ and $b_1$ respectively represent the L value, a value and b value in the region on the recording medium 10 where the invisible image 12, the visible image 14 or the visible image 16 is not formed; and $L_2$, $a_2$ and $b_2$ respectively represent the L value, a value and b value in an invisible image 12, when the invisible image 12 with an amount of adherence 4 g/$m^2$ has been formed on the recording medium 10 using the first recording material mentioned above.

Furthermore, in the formula (IV), $L_1$, $a_1$, $b_1$, $L_2$, $a_2$ and $b_2$ are obtained using a reflective spectrodensitometer. According to the exemplary embodiment, $L_1$, $a_1$, $b_1$, $L_2$, $a_2$ and $b_2$ are values measured using X-rite 939 manufactured by X-Rite, Inc. as the reflective spectrodensitometer.

The first material contained in the first recording material and the second recording material as the coloring material may be used as long as it has the characteristics described above, and specific examples include VONPc, MNPc (M=Si, Ge, Ga, Mg, Al, Ti, TiO, ZrO, Zr, V, Mn, Fe, Co, Ni, Cu, Zn, Sn, Pb or Pt), and a perimidine-based squarylium dye represented by the following structural formula (I).

Among these, a perimidine-based squarylium dye represented by the following structural formula (I) is preferred from the viewpoint of having excellent light fastness.

(I)

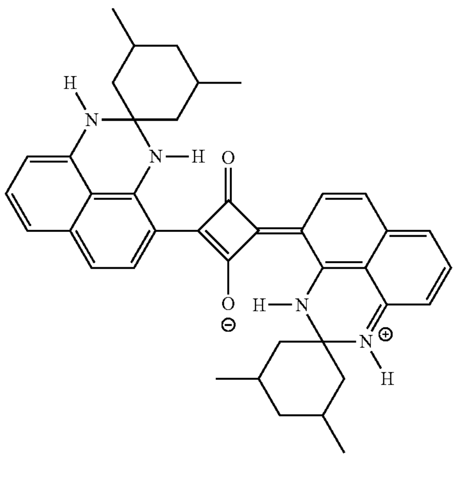

The perimidine-based squarylium dye represented by the structural formula (I) has higher crystallinity and lower solubility in binder resins, as compared with other coloring materials having infrared absorption properties. Accordingly, it is thought that cleavage of intramolecular bonds due to the absorption of light energy caused by irradiation with light is suppressed. Therefore, the perimidine-based squarylium dye represented by the structural formula (I) is thought to have excellent light fastness compared with other coloring materials having infrared absorption properties.

The perimidine-based squarylium dye represented by the structural formula (I) has higher crystallinity compared with other coloring materials having infrared absorption properties, as explained above, but specifically, there may be mentioned a dye exhibiting diffraction peaks at Bragg's angles (2θ±0.2°) of at least 9.9°, 13.2°, 19.9°, 20.8° and 23.0° in the powder X-ray diffraction spectrum measured by irradiation of with an X-ray having a wavelength of 1.5405 Å from the Cu target, a dye exhibiting diffraction peaks at Bragg's angles of at least 17.7°, 19.9°, 22.1°, 23.2° and 24.9°, a dye exhibiting diffraction peaks at Bragg's angles of 22.6°, 24.2°, 8.9°, 17.1° and 18.4°, and the like.

Among them, a dye exhibiting diffraction peaks at 17.7°, 19.9°, 22.1°, 23.2° and 24.9° is preferable from the viewpoint of light fastness.

In addition, the perimidine-based squarylium dye represented by the structural formula (I) has sufficiently high reflectance in the visible wavelength region from 400 nm to 750 nm, and has sufficiently low reflectance in the near-infrared wavelength region of from 750 nm to 1000 nm.

This phrase "having sufficiently high reflectance" implies that the maximum reflectance percentage over the entire region of the visible wavelength region of from 400 nm to 750 is at least 75% or higher.

The phrase "having sufficiently low reflectance" implies that the maximum reflectance percentage over the entire region of the near-infrared wavelength region from 750 nm to 1000 nm is at least 35% or lower.

The perimidine-based squarylium dye represented by the structural formula (I) is obtained according to, for example, the following reaction scheme.

(A-1)

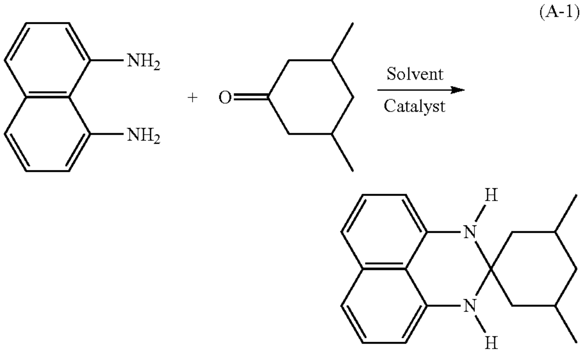

(a)

(A-2)

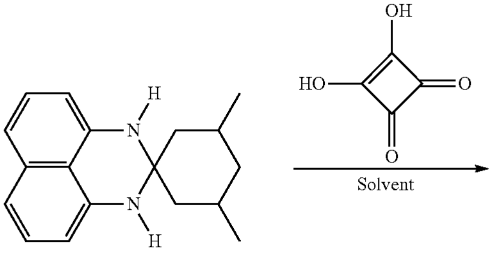

(a)

-continued

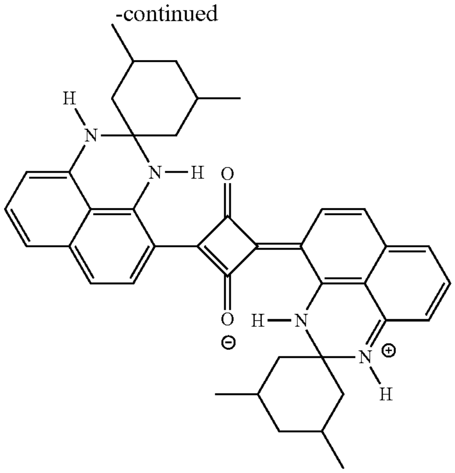

(I)

More specifically, a perimidine intermediate (a) is obtained by allowing 1,8-diaminonaphthalene and 3,5-dimethylcyclohexanone to react in the presence of catalyst under the conditions of azeotropic reflux in a solvent (process (A-1)).

Examples of the catalyst used in the process (A-1) include p-toluenesulfonic acid monohydrate, benzenesulfonic acid monohydrate, 4-chlorobenzenesulfonic acid hydrate, pyridine-3-sulfonic acid, ethanesulfonic acid, sulfuric acid, nitric acid, acetic acid, and the like. Examples of the solvent used in the process (A-1) include alcohols, aromatic hydrocarbons, and the like. The perimidine intermediate (a) is purified by high performance column chromatography or recrystallization.

Next, a perimidine-based squarylium dye represented by the structural formula (I) is obtained by allowing the perimidine intermediate (a) and 3,4-dihydroxycyclobut-3-ene-1,2-dione (also called as "squaric acid" or "quadratic acid") to react in a solvent under the conditions of azeotropic reflux (process (A-2)). This process (A-2) is desirably carried out in a nitrogen gas atmosphere.

Examples of the solvent used in the process (A-2) include alcohols such as 1-propanol, 1-butanol and 1-pentanol; aromatic hydrocarbons such as benzene, toluene, xylene and monochlorobenzene; ethers such as tetrahydrofuran and dioxane; halogenated hydrocarbons such as chloroform, dichloroethane, trichloroethane and dichloropropane; and amides such as N,N-dimethylformamide and N,N-dimethylacetamide. The alcohols may be used individually, but solvents such as aromatic hydrocarbons, ethers, halogenated hydrocarbons or amides are preferably used as mixtures with alcoholic solvents. Specific examples of the solvent include 1-propanol, 2-propanol, 1-butanol, 2-butanol, a solvent mixture of 1-propanol and benzene, a solvent mixture of 1-propanol and toluene, a solvent mixture of 1-propanol and N,N-dimethylformamide, a solvent mixture of 2-propanol and benzene, a solvent mixture of 2-propanol and toluene, a solvent mixture of 2-propanol and N,N-dimethylformamide, a solvent mixture of 1-butanol and benzene, a solvent mixture of 1-butanol and toluene, a solvent mixture of 1-butanol and N,N-dimethylformamide, a solvent mixture of 2-butanol and benzene, a solvent mixture of 2-butanol and toluene, and a solvent mixture of 2-butanol and N,N-dimethylformamide. In the case of using a solvent mixture, the concentration of the alcoholic solvent is preferably 1% by volume or more, or from 5% by volume to 75% by volume.

The molar ratio of the perimidine derivative (a) to 3,4-dihydroxycyclobut-3-ene-1,2-dione (mole number of perimidine derivative (a)/mole number of 3,4-dihydroxycyclobut-3-ene-1,2-dione) in the process (A-2) may be from 1 to 4, or from 1.5 to 3. When the molar ratio is smaller than 1, the yield of the perimidine-based squarylium dye represented by the structural formula (I) may be decreased. When the molar ratio exceeds 4, the use efficiency of the perimidine derivative (a) becomes poor, and the separation and purification of the perimidine-based squarylium dye represented by the structural formula (I) may become difficult.

Furthermore, in the process (A-2), when a dehydrating agent is used, the reaction time is shortened, and the yield of the perimidine-based squarylium dye represented by the structural formula (I) tends to increase. The dehydrating agent is not particularly limited as long as it does not react with the perimidine intermediate (a) and 3,4-dihydroxycyclobut-3-ene-1,2-dione, but examples include an orthoformic acid ester such as trimethyl orthoformate, triethyl orthoformate, tripropyl orthoformate or tributyl orthoformate; a molecular sieve, and the like.

The reaction temperature in the process (A-2) may vary depending on the type of the solvent used, but the temperature of the reaction liquid is preferably 60° C. or higher, or 75° C. or higher. For example, in the case of using a solvent mixture of 1-butanol and toluene, the temperature of the reaction liquid is preferably from 75° C. to 105° C.

The reaction time in the process (A-2) may vary depending on the type of the solvent or the temperature of the reaction liquid, but for example, when the reaction is performed using a solvent mixture of 1-butanol and toluene at a temperature of the reaction liquid from 90° C. to 105° C., the reaction time may be from 2 hours to 4 hours.

The perimidine-based squarylium dye represented by the structural formula (I) produced in the process (A-2) is purified by solvent washing, high performance column chromatography or recrystallization.

In regard to the recording medium 10 of the exemplary embodiment of the invention, when the perimidine-based squarylium dye represented by the structural formula (I) is used as the first material, which is the coloring material contained in the first recording material and the second recording material, it is desirable to carry out a pigmentization treatment. However, it is thought that if a pigmentization treatment is carried out, the crystal system becomes prone to change.

Therefore, it is preferable to regulate the method of the pigmentization treatment and the treatment conditions so that conversion of the crystal system of the perimidine-based squarylium dye particles (raw material) prior to the pigmentization treatment is suppressed. That is, it is preferable to regulate the method and conditions so as to exhibit the X-ray diffraction peaks of the perimidine-based squarylium dye particles. Specifically, since it is desirable for the perimidine-based squarylium dye to exhibit diffraction peas at Bragg's angles) (2θ±0.2°) of at least 17.7°, 19.9°, 22.1°, 23.2° and 24.9° in the powder X-ray diffraction spectrum measured by irradiation with a X-ray having a wavelength of 1.5405 Å from the Cu target, it is preferable that the method and conditions be regulated so that the perimidine-based squarylium dye after the pigmentization treatment exhibits those diffraction peaks, from the viewpoint of enhancing the light fastness.

An example of the pigmentization method may be a method of mixing the perimidine-based squarylium dye represented by the structural formula (I) and an aqueous solution of sodium dodecyl benzenesulfonate, and subjecting the mixture liquid to a pigmentization treatment. The mixture liquid may also have the concentrated regulated by adding water, if necessary. The apparatus to be used in the pigmentization treatment may be a bead mill processing apparatus.

In the exemplary embodiment, when the perimidine-based squarylium dye represented by the structural formula (I) is used as the first material, the first recording material and second recording material containing this first material preferably contains the perimidine-based squarylium dye represented by the structural formula (I) in the form of particles. The perimidine-based squarylium dye represented by the structural formula (I) has greater intermolecular interaction as compared with other dyes having infrared absorption properties, and particles of the dye have high crystallinity. Accordingly, it is believed that when the perimidine-based squarylium dye represented by the structural formula (I) in a particulate form is incorporated into a recording material, the infrared color-developing ability and light fastness of the invisible image 12 can be further enhanced.

The particles of the perimidine-based squarylium dye represented by the structural formula (I) are obtained by, for example, dissolving the purification production obtained after the process (A-2) in tetrahydrofuran, injecting the solution into ice-cold distilled water using a syringe or the like while the mixture is stirred, to thereby generate precipitates, collecting the precipitates by suction filtration, washing the precipitates with distilled water, and then drying the precipitates in a vacuum. At this time, the particle diameter of the resulting precipitates is regulated by regulating the concentration of the perimidine-based squarylium dye represented by the structural formula (I) in the solution, the rate of injection of the solution, the amount or temperature of the distilled water, the rate of stirring or the like.

The median diameter d50 of the particles of the perimidine-based squarylium dye represented by the structural formula (I) may be from 10 nm to 300 nm, or from 20 nm to 200 nm.

It is thought that when the median diameter d50 of the particles of the perimidine-based squarylium dye represented by the structural formula (I) is within the range mentioned above, a decrease in the light fastness is suppressed, and the infrared color developing ability is enhanced.

The treatment for granulation and the control of median diameter may be carried out either before or after the pigmentization treatment.

On the other hand, the third recording material constituting the second region 14B of the visible image 14 contains at least one second material as the coloring material, as explained above.

This second material of one or plural types is a dye having higher light fastness as compared with the first material that is respectively contained in the invisible image 12 and the first region 14A of the visible image 14.

The color of the second region 14B that is constituted by the third recording material is adjusted to be the color of the first region 14A when the first material is in any stage of a process of discoloration. Accordingly, the at least one second material contained in the third recording material may be regulated in terms of the type or concentration of the dye, so that the colors corresponding to the course of discoloration of the first material, singly or as a mixture.

Furthermore, since the second region 14B of the visible image 14 constituted by this third recording material is visible, the second material contained in the third recording material may be favorably selected to be a dye that exhibits light absorption at least in the wavelength region of the visible light and at the same time, has higher light fastness than that of the first material, which dye allows the color difference $\Delta E$ between the second region and the first region 14A to be less than 3 by regulating the content.

It is desirable that the at least one second material contained in this third recording material satisfies the characteristics described above, and dyes of C (cyan), M (magenta), Y (yellow) and K (black) used in known toners or inks may be used favorably. The second material may be selected in accordance with the first material (its color or the like), which is the coloring material contained in the first region 14A of the invisible image 12 and the visible image 14.

The uses of the first recording material, second recording material and third recording material are not particularly limited, but these recording materials are used in the applications such as toners for electrophotography, inks for inkjet printer, or inks for letterpress printing, offset printing, flexographic printing, gravure printing or silk printing.

Accordingly, the invisible image 12 or the first region 14A and the second region 14B in the visible image 14 on the recording medium 10 of the exemplary embodiment may be constituted by the first recording material and second recording material described above, and the regions may be formed by an image forming apparatus of electrophotographic mode, may be formed by an inkjet printer, or may be formed by an apparatus for letterpress printing, offset printing, flexographic printing, gravure printing, silk printing or the like.

In regard to the method for forming this invisible image 12 or the visible image 14, a conventionally known method may be used.

When the first recording material, the second recording material and the third recording material are toners used in an image forming apparatus of electrophotographic mode, the first recording material, the second recording material and the third recording material according to the exemplary embodiment may be used individually as one-component developing agents, or may be used as two-component developing agents combined with a carrier. As for the carrier, any known carrier may be used, and for example, a resin-coated carrier having a resin coating layer on a core. This resin coating layer may have an electroconductive powder or the like dispersed therein.

Furthermore, when the first recording material, the second recording material and the third recording material are toners that are used in image forming apparatuses of electrophotographic mode, the first recording material, the second recording material and the third recording material contain a binding resin. Examples of the binding resin to be used include homopolymers or copolymers of stylenes such as styrene or chlorostyrene; a monoolefin such as ethylene, propylene, butylene or isoprene; a vinyl ester such as vinyl acetate, vinyl propionate, vinyl benzoate or vinyl butyrate; an $\alpha$-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate or dodecyl methacrylate; vinyl ethers such as vinyl methyl ether, vinyl ethyl ether or vinyl butyl ether; vinyl ketones such as vinyl methyl ketone, vinyl hexyl ketone or vinyl isopropenyl ketone, and particularly representative biding resins include polystyrene, a styrene-alkyl acrylate copolymer, a styrene-alkyl methacrylate copolymer, a styrene-acrylonitrile copolymer, a styrene-butadiene copolymer, a styrene-maleic anhydride copolymer, polyethylene, polypropylene and the like. Furthermore, a polyester, a polyurethane, an epoxy resin, a silicone resin, a polyamide, modified rosin, paraffin wax and the like are also used as binding resins.

When the first recording material, the second recording material and the third recording material are toners used in image forming apparatuses of electrophotographic mode, the recording materials may further contain an electrostatic charge control agent, an offset preventing agent, or the like. The electrostatic charge control agent may be an agent for positive electrostatic charge or an agent for negative electrostatic charge, and examples of the agent for positive electrostatic charge include quaternary ammonium compounds. Furthermore, examples of the agent for negative electrostatic charge include metal complexes of alkylsalicylic acid, resin type electrostatic charge control agents containing polar groups, and the like. Examples of the offset preventing agent include low molecular weight polyethylene, low molecular weight polypropylene, and the like.

When the first recording material, the second recording material and the third recording material are toners used in image forming apparatuses of electrophotographic mode, inorganic particles or organic particles may also be added to the toner surface as an external additive, in order to bring about an enhancement of fluidity and powder conservation properties, control of frictional charges, an enhancement of transfer performance and cleaning performance, and the like. Examples of the inorganic particles include well-known products, for example, silica, alumina, titania, calcium carbonate, magnesium carbonate, calcium phosphate, cerium oxide and the like. Furthermore, inorganic particles may be subjected to a known surface treatment according to the purpose. Examples of the organic particles include emulsifying polymers containing vinylidene fluoride, methyl methacrylate, styrene-methyl methacrylate and the like as constituent components, or soap-free polymers.

When the first recording material, the second recording material and the third recording material are inks used in inkjet printers, the recording materials may be in the form of aqueous inks containing water. Furthermore, the first recording material, second recording material and third recording material of the exemplary embodiment may be further incorporated with a water-soluble organic solvent so as to prevent drying of the ink and to enhance penetrability of the ink. The water may be ion-exchanged water, ultrafiltered water, pure water or the like. Examples of the organic solvent include polyhydric alcohols such as ethylene glycol, diethylene glycol, polyethylene glycol and glycerin; N-alkylpyrrolidones, esters such as ethyl acetate and amyl acetate; lower alcohols such as methanol, ethanol, propanol and butanol; glycol ethers such as ethylene oxide or propylene oxide adducts of methanol, butanol and phenol; and the like. The organic solvent used may be of one kind or of two or more kinds. The organic solvent is appropriately selected in consideration of hygroscopic properties, moisture-retaining properties, solubility of the perimidine-based squarylium dye according to the exemplary embodiment, penetrability, viscosity of the ink, freezing point, and the like. The content of the organic solvent in the ink used for inkjet printers may be from 1% by weight to 60% by weight.

When the first recording material, second recording material and third recording material according to the exemplary embodiment of the invention are inks used in inkjet printers, the recording materials added with additives that are traditionally known as ink components, so as to satisfy the various conditions required of inkjet printer systems. Examples of these additives a pH adjusting agent, a resistivity adjusting agent, an antioxidant, an antiseptic agent, a fungi preventing agent, a metal sequestering agent, and the like. The pH adjusting agent may be an alcohol amines, ammonium salts, metal hydroxides or the like. The resistivity adjusting agent may be an organic salt or an inorganic salt. The metal sequestering agent may be a chelating agent or the like.

When the first recording material, second recording material and third recording material according to the exemplary embodiment of the invention are inks used in inkjet printers, the recording materials may also contain a water-soluble resin such as polyvinyl alcohol, polyvinylpyrrolidone, carboxymethylcellulose, a styrene-acrylic acid resin or a styrene-maleic acid resin, to the extent that blocking of spray nozzle units, changes in the ink jetting direction or the like does not occur.

Furthermore, when the first recording material, second recording material and third recording material according to the exemplary embodiment of the invention are ink for letterpress printing, offset printing, flexographic printing, gravure printing or silk printing, the recording material may be in the form of oily ink containing a polymer or an organic solvent. The polymer may be generally a natural resin such as a protein, a rubber, celluloses, shellac, copal, starch, or rosin; a thermoplastic resin such as a vinyl-based resin, an acrylic resin, a styrene-based resin, a polyolefin-based resin or a novolac type phenolic resin; a thermosetting resin such as a resol type phenolic resin, a urea resin, a melamine resin, a polyurethane resin, an epoxy resin, or an unsaturated polyester; or the like. Examples of the organic solvent include those organic solvents exemplified in the explanation on the ink for inkjet printer.

When the first recording material, second recording material and third recording material according to the exemplary embodiment of the invention are ink for letterpress printing, offset printing, flexographic printing, gravure printing or silk printing, the first recording material and the second recording material may be further added with additives such as a plasticizing agent for enhancing the flexibility or strength of printed films, a solvent for adjusting viscosity and enhancing dryability, a drying agent, a viscosity adjusting agent, a dispersant, and various reactive agents.

Since the perimidine-based squarylium dye represented by the structural formula (I) is a dye having excellent light fastness as explained above, the first recording material and second recording material containing the dye as the first material are excellent in light fastness. From the viewpoint of further enhancing the light fastness of these first recording material and second recording material, the recording materials may be constituted to further contain a stabilizer. It is necessary for the stabilizer to receive energy from an organic near-infrared absorbing dye in the excited state, and thus a compound having an absorption band on the longer wavelength side than the absorption band of infrared absorbing dyes. Furthermore, it is preferable to use a stabilizer that hardly undergoes degradation by singlet oxygen, and has high compatibility with the perimidine-based squarylium dye represented by the structural formula (I). Examples of the stabilizer having these characteristics include organometallic complex compounds. Among them, there may be mentioned a compound represented by the following formula (V).

(V)

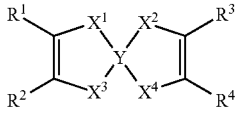

In the formula (V), $R^1$, $R^2$, $R^3$ and $R^4$, which may be identical or different, each represent a substituted or unsubstituted phenyl group. When the phenyl group represented by $R^1$, $R^2$, $R^3$ or $R^4$ has a substituent, the substituent may be H, $NH_2$, OH, $N(C_hH_{2h+1})_2$, $OC_hH_{2h+1}$, $C_hH_{2h-1}$, $C_hH_{2h+1}$, $C_hH_{2h}OH$, $C_hH_{2h}OC_iH_{2i+1}$ (wherein h represents an integer from 1 to 18, and i represents an integer from 1 to 6), or the like. Furthermore, $X^1$, $X^2$, $X^3$ and $X^4$, which may be identical with or different from each other, each represent O, S or Se, and Y represents a transition metal such as Ni, Co, Mn, Pd, Cu or Pt.

Among the compounds represented by the formula (V), a compound represented by the following formula (VI) is particularly preferred.

(VI)

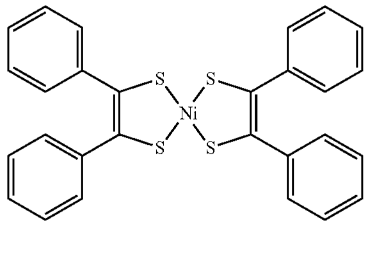

The concentration of the stabilizer respectively contained in the first recording material and the second recording material may be from 1/10 times to two times the weight of the perimidine-based squarylium dye represented by the structural formula (I).

EXAMPLES

Test Example 1

(Production of Perimidine-Based Squarylium Dye: Two-Step Synthesis)

A mixed liquid of 4.843 g (98%, 30.0 mmol) of 1,8-diaminonaphthalene, 3.886 g (98%, 30.2 mmol) of 3,5-dimethylcyclohexanone, 10 mg (0.053 mmol) of p-toluenesulfonic acid monohydrate and 45 ml of toluene is heated to reflux for 5 hours while the mixed liquid is stirred in a nitrogen gas atmosphere. Any water generated during the reaction is removed by azeotropic distillation. After completion of the reaction, a dark brown solid obtained by distilling toluene is extracted with acetone, purified by recrystallization from a mixed solvent of acetone and ethanol, and dried. Thus, 7.48 g (yield 93.6%) of a brown solid is obtained. The analysis results based on $^1H$-NMR spectrum ($CDCl_3$) of the obtained brown solid are presented below.

$^1H$-NMR spectrum ($CDCl_3$): δ=7.25, 7.23, 7.22, 7.20, 7.17, 7.15 (m, 4H, $H_{arom}$); 6.54 (d×d, $J_1$=23.05 Hz, $J_2$=7.19 Hz, 2H, $H_{arom}$); 4.62 (br s, 2H, 2×NH); 2.11 (d, J=12.68 Hz, 2H, $CH_2$); 1.75, 1.71, 1.70, 1.69, 1.67, 1.66 (m, 3H, 2×CH, $CH_2$); 1.03 (t, J=12.68 Hz, 2H, $CH_2$); 0.89 (d, J=6.34 Hz, 6H, 2×$CH_3$); 0.63 (d, J=11.71 Hz, 1H, $CH_2$).

A mixed liquid of 4.69 g (17.6 mmol) of the brown solid obtained above, 913 mg (8.0 mmol) of 3,4-dihydroxycyclobut-3-ene-1,2-dione, 40 ml of n-butanol, and 60 ml of toluene is heated to reflux for 3 hours while the mixed liquid is stirred in a nitrogen atmosphere. Any water generated during the reaction is removed by azeotropic distillation. After completion of the reaction, most of the solvent is distilled in a nitrogen gas atmosphere, and 120 ml of hexane is added while the resulting reaction mixture is stirred. Black brown precipitates generated therefrom are filtered by suction, washed with hexane and dried to obtain a blue black solid.

This solid is washed sequentially with ethanol, acetone, a 60% aqueous solution of ethanol, ethanol and acetone, and thus 4.30 g (yield 88%) of the desired compound (blue black solid) is obtained.

The obtained dye compound is identified by spectroscopic methods such as infrared absorption spectrum (KBr purification method), 1H-NMR (DMSO-d6), FD-MS, elemental analysis, and visible-near-infrared absorption spectrum. The identification data are presented below. A visible-near-infrared absorption spectrum is presented in FIG. 6. As a result of the identification, it is verified that the obtained compound is a perimidine-based squarylium dye represented by the structural formula (I).

Infrared Absorption Spectrum (KBr Purification Method)

$\nu_{max}$=3487, 3429, 3336, (NH), 3053 (=C—H), 2947 (CH3), 2914, 2902 (CH2), 2864 (CH3), 2360, 1618, 1599, 1558, 1541 (C=C ring), 1450, 1421, 1363 (CH3, CH2), 1315, 1223, 1201 (C—N), 1163, 1119 (C—O—), 941, 924, 822, 783, 715 $cm^{-1}$ $^1H$-NMR spectrum (DMSO-d6): δ=10.52 (m, 2H, NH); 7.80, 7.78 (d, 2H, $H_{arom}$); 7.35, 7.33 (m, 2H, $H_{arom}$); 7.25 (m, 2H, NH); 6.82, 6.80, 6.78 (m, 4H, $H_{arom}$); 6.74, 6.72, 6.52, 6.50 (m, 2H, $H_{arom}$), 2.17 (m, 5H, $CH_2$); 1.91 (m, 3H, $CH_2$); 1.71 (m, 2H, CH, $CH_2$); 1.15, 1.12 (m, 4H, $CH_2$); 0.92, 0.91 (m, 12H, 4×$CH_3$); 0.66 (m, 2H, $CH_2$) Mass spectrum (FD): m/z=610 ($M^+$, 100%), 611 ($M^+$+1, 47.5%).

Elemental analysis

C: 78.6% (found value), 78.66% (calculated value)

H: 6.96% (found value), 6.93% (calculated value)

N: 9.02% (found value), 9.17% (calculated value)

O: 5.42% (found value), 5.24% (calculated value)

Visible-near-infrared absorption spectrum (FIG. 6):

$\lambda_{max}$=809 nm (in tetrahydrofuran solution)

$\epsilon_{max}$=1.68×$10^5 M^{-1} cm^{-1}$ (in tetrahydrofuran solution)

(Pigmentization Treatment)

Next, 51 g of the obtained perimidine-based squarylium dye and 450 g of an aqueous solution of surfactant (specifically, an aqueous solution of sodium alkylbenzenesulfonate) are introduced into a bead mill processing apparatus (trade name: SVM-015, manufactured by Aimex Co., Ltd.), and operation of the apparatus is carried out for 4 hours with 485 g of 1-mmφ beads at a speed of disk rotation of 400 rpm. The particle size distribution of the perimidine-based squarylium dye (hereinafter, called as (A) particles) recovered from the obtained slurry is measured, and the median diameter is 100 nm.

(Measurement of Powder X-Ray Diffraction)

The perimidine-based squarylium dye particles prior to the pigmentization treatment in the Test Example 1 (hereinafter, referred to as "raw material"), and the (A) particles in the Test Example 1 are subjected to measurement of powder X-ray diffraction by irradiation with an X-ray having a wavelength λ=1.5405 Å from the Cu target, using an X-ray diffraction apparatus (trade name: D8 DISCOVER, manufactured by Bruker AXS, Inc. The resulting powder X-ray diffraction spectrum is presented in FIG. 6.

Figure 6:
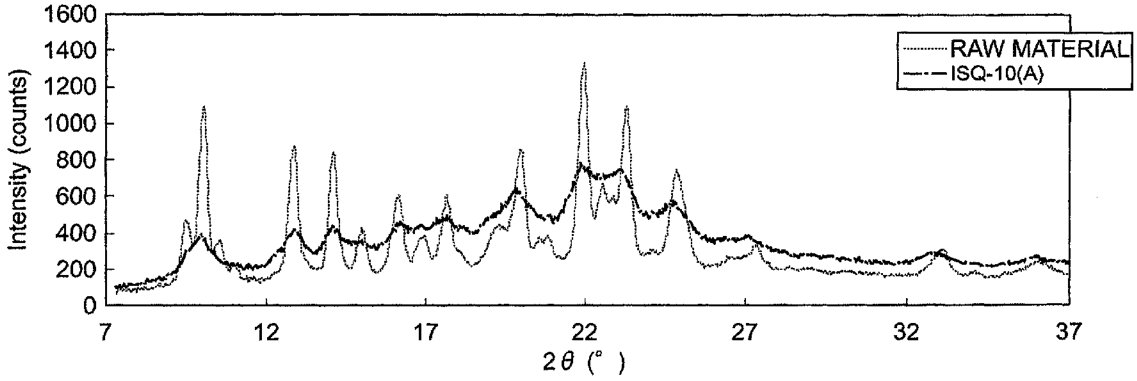
FIG. 6 is a plot showing the X-ray diffraction spectrum of the (A) particles and raw material used in the Test Example.

It can be seen from FIG. 6 that the (A) particles exhibit diffraction peaks at Bragg's angles (2θ±2°) of 22.1°, 23.2°, 19.9°, 24.9° and 17.7°, in an order of decreasing intensity, and are of the same crystal system as the raw material.

Figure 7:
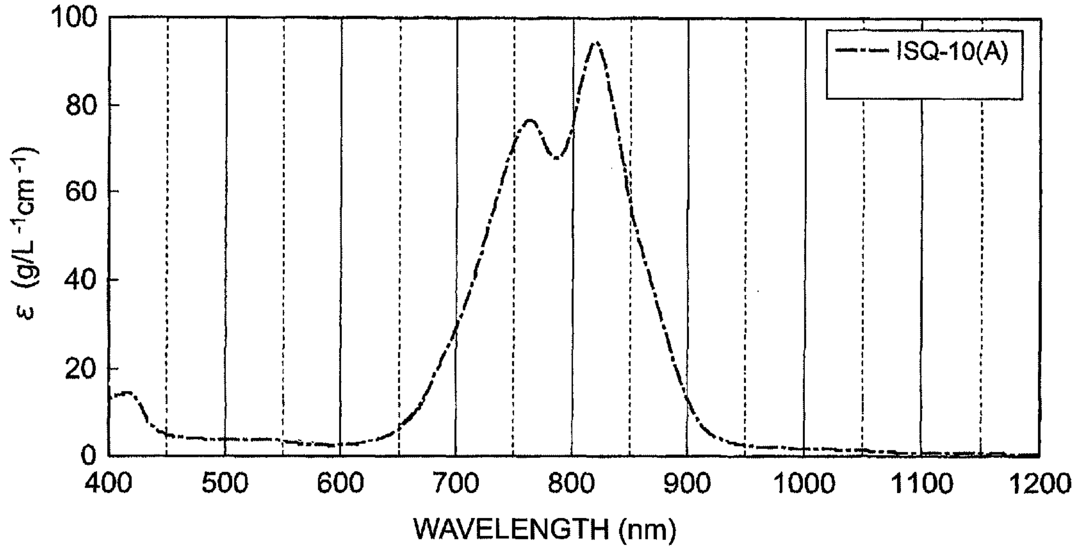
FIG. 7 is a plot showing the infrared absorption spectrum of the slurry used in the Test Example.

The absorption spectrum of the slurry obtained by the pigmentization treatment is presented in FIG. 7.

—Conditioning of Recording Material for Invisible Image (First Recording Material), and Production of Invisible Image—

The (A) particles conditions as described above are made into toner by a kneading pulverization method using a polyester resin, and an image is formed with actual equipment, at a coverage ratio of <10%.

In regard to this image, the results of readability evaluation by a recognition device are presented in Table 1 in terms of the useful life of the coloring material. This recognition device throws an illumination light to a code pattern, and forms the reflected light that has passed through a visible-cutoff filter, into an image on an image capturing element. Decoding of a pattern image obtained at a rate of 60 frames per second is carried out, the decoding error ratio is determined, and this ratio is evaluated as the readability. As for the illumination, a current of 100 mA is applied to an infrared LED (trade name: SFH4350, manufactured by Osram GmbH) having a designed central wavelength. As the image capturing element, an infrared CMOS sensor (with the spectral sensitivity at 850 nm being 60% or more of the spectral sensitivity at 550 nm, driving frequency 13.5 MHz) making use of a sensor in global shutter mode is employed. As the visible-cutoff filter, TECHNALIGHT IR-R2805 manufactured by Sumitomo Bakelite Co., Ltd. is used.

—Conditioning of Recording Material for First Region of Visible Image (Second Recording Material, and Production of First Region of Visible Image—

An image with a coverage ratio of 100% is formed with actual equipment, using the (A) particle-containing toner produced as described above.

—Conditioning of Recording Material for Second Region of Visible Image (Third Recording Material), and Production of Second Region of Visible Image—

Using a multifunction color printer (trade name: APEOSPORT-II C4300, manufactured by Fuji Xerox Co., Ltd.), a color that is the same as the color exhibited by the first material in an undeteriorated state, is reproduced by a second material (toner stored in the multifunction printer, black, cyan, magenta and yellow), and is printed out.

the 850 nm reflectance of the first region 14A by a spectrophotometer (trade name: U-4100, manufactured by Hitachi High-Technologies Corp.) are carried out at time points of 58 hours, 207 hours and 350 hours, which correspond to 2 years, 7 years and 12 years, respectively, in terms of the office environment. The measurement results are presented in Table 1.

The color difference between the first region 14A and second region 14B of the visible image 14 in this measurement is visually identified. The results of identification are presented in Table 1.

The readability of the information embedded in the invisible image area is confirmed by using a pen-shaped reading device equipped as follows. The greater the tilt of the pen with respect to paper, the lower the readability tends to be. Accordingly, readability can be evaluated in terms of the angle between the pen and the paper.

(Pen-Shaped Reading Device)

Lighting: Infrared Emitters (SFH4350, trade name, manufactured by OSRAM Opto Semiconductors GmbH) having a design center wavelength of 850 nm as infrared LED (IF=100 mA).

Pickup Device: Infrared CMOS sensor with global shutter system sensor where spectral sensitivity at wavelength of 850 nm is 60% or more of that at 550 nm. Drive frequency of 13.5 MHz.

Visible light cut-off filter: TECHNALIGHT IR (resistered trade name), R2805 (trade name; manufactured by Sumitomo Bakelite Co. Ltd.).

(Evaluation)

Readability is evaluated according to the following criteria. The results of the readability are presented in Table 1 as pen sensitivity.

A: Errors do not occur until the pen is tilted to 45°.

B: Errors do not occur until the pen is tilted to 40° and negligibly small errors occur at 45°.

C: Negligibly small errors occur at 40°.

| | | | Infrared reflectance R (%) | | | |
|---|---|---|---|---|---|---|
| | | | Before light irradiation | After 58 hours | After 207 hours | After 350 hours |
| Invisible image | First recording material | Pen sensitivity | A | A | B | C |
| First region of visible image | Second recording material | Infrared reflectance % | 18 | 21 | 24 | 30 |
| Second region of visible image | Third recording material | | — | — | — | — |
| Color difference between first region and second region (visual identification) | | | No color difference | No color difference | Presence of slight color difference | Large color difference after 207 hours |

In addition, the color of this second region 14B is the same as the color of the first region 14A immediately after production (that is, the color of (A) as the first material in an undeteriorated state).

—Measurement and Evaluation by Visual Inspection of State of Deterioration—

The invisible image 12, the first region 14A of the visible image 14, the second region 14B of the visible image 14 produced as described above are subjected to light irradiation for 350 hours (light source: fluorescent lamp, illuminance of radiation: 62500 Lux, without UV-cutoff filter).

An evaluation of readability of the invisible image 12 by a recognition device (the same recognition device used in the readability evaluation described above), and measurement of As discussed above, a color difference between the first region 14A and the second region 14B is visually recognized, and it can be seen that as the color difference increases, the infrared reflectance of the invisible image 12 decreases. Accordingly, when the color difference between the firs region 14A and the second region 14B of the visible image is visually identified, the degree of deterioration of the first material contained in the invisible image 12 is visually identified thereby.

What is claimed is:

1. A recording medium comprising:

an invisible image formed with a first recording material; and a visible image comprising:

a first region formed with a second recording material having approximately the same light fastness as that of the first recording material; and a second region formed with a third recording material having higher light fastness than that of the first recording material, wherein the color of the second region is a color corresponding to a predetermined stage of the process of discoloration of the first region such that the color difference, ΔE, between the first and second regions is less than 3.

2. The recording medium of claim 1, wherein:

the first recording material contains a first material having infrared absorption properties as a coloring material;

the second recording material contains the first material as a coloring material; and the third recording material contains at least one second material having higher light fastness than that of the first material, as a coloring material.

3. The recording medium of claim 1, wherein the first material is a perimidine-based squarylium dye represented by the following structural formula (I):

(I)

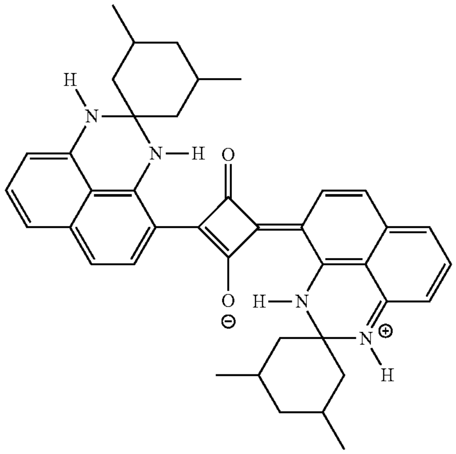

4. The recording medium of claim 2, wherein the color of the second region is a color exhibited by the first region when the first material has reached an end of its useful life such that when an image having a print coverage ratio of 100% is formed using the first material, the reflectance of the image upon irradiation with infrared light becomes greater than 35% over the entire wavelength region of the infrared light.

5. A method for forming images on the recording medium according to claim 1, comprising:

forming an invisible image with a first recording material; and forming a visible image comprising:

a first region with a second recording material having approximately the same light fastness as that of the first recording material; and a second region formed with a third recording material having higher light fastness than that of the first recording material, wherein the color of the second region is a color corresponding to a predetermined stage of the process of discoloration of the first region such that the color difference, ΔE, between the first and second regions is less than 3.

6. The method of claim 5, wherein:

the first recording material contains a first material having infrared absorption properties as a coloring material;

the second recording material contains the first material as a coloring material; and the third recording material contains at least one second material having higher light fastness than that of the first material, as a coloring material.

7. The method of claim 5, wherein the first material is a perimidine-based squarylium dye represented by the following structural formula (I):

(I)

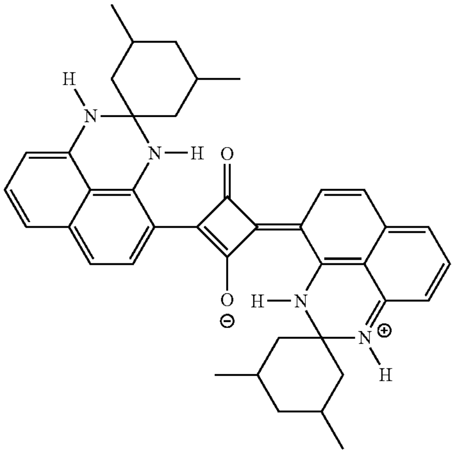

8. The method of claim 5, wherein the images are formed in a printing method selected from the group consisting of inkjet printing, letterpress printing, offset printing, lexographic printing, gravure printing, and silk printing.

9. The recording medium of claim 1, wherein the second recording material is the same as the first recording material.

10. The recording medium of claim 1, wherein the second recording material visually identifies a current deterioration state of the first recording material.

11. The recording medium of claim 1, wherein the invisible image is readable when irradiated with infrared light.

* * * * *